US012658846B2

(12) United States Patent
Srnec

(10) Patent No.: US 12,658,846 B2
(45) Date of Patent: Jun. 16, 2026

(54) METHODS AND SYSTEMS FOR ISOLATING A HIGH VOLTAGE CONTINUOUSLY PRODUCING POWER SOURCE

(71) Applicant: THERMO KING LLC, Minneapolis, MN (US)

(72) Inventor: Matthew Srnec, Minnetonka, MN (US)

(73) Assignee: THERMO KING LLC, Minneapolis, MN (US)

( * ) Notice: Subject to any disclaimer, the term of this patent is extended or adjusted under 35 U.S.C. 154(b) by 224 days.

(21) Appl. No.: 18/345,019

(22) Filed: Jun. 30, 2023

(65) Prior Publication Data

US 2025/0007451 A1 Jan. 2, 2025

(51) Int. Cl.
| | |
|---|---|
| *H02S 40/36* | (2014.01) |
| *B60H 1/32* | (2006.01) |
| *B60R 16/03* | (2006.01) |
| *H02H 7/20* | (2006.01) |

(Continued)

(52) U.S. Cl.
CPC .............. *H02S 40/36* (2014.12); *B60R 16/03* (2013.01); *H02H 7/20* (2013.01); *H02S 10/40* (2014.12); *H02S 50/00* (2013.01); *B60H 1/3226* (2013.01)

(58) Field of Classification Search
CPC .......... H02S 40/36; H02S 10/40; H02S 50/00; B60R 16/03; H02H 7/20; B60H 1/3226
See application file for complete search history.

(56) References Cited

U.S. PATENT DOCUMENTS

| | | | |
|---|---|---|---|
| 8,373,390 B2 | 2/2013 | Oh et al. | |
| 2015/0349709 A1* | 12/2015 | Ponec | H02S 40/34 |
| | | | 136/244 |
| 2020/0389119 A1 | 12/2020 | Sherwood et al. | |

(Continued)

FOREIGN PATENT DOCUMENTS

| | | |
|---|---|---|
| DE | 102021211448 | 4/2023 |
| JP | 2013-191688 | 9/2013 |

(Continued)

OTHER PUBLICATIONS

Extended European Search Report, issued in the corresponding European patent application No. 24185582.4, dated Nov. 29, 2024, 13 pages.

*Primary Examiner* — Rexford N Barnie
*Assistant Examiner* — Duc M Pham
(74) *Attorney, Agent, or Firm* — HSML P.C.

(57) ABSTRACT

Systems and methods for electrically isolating a high voltage continuously producing power source. In one embodiment, a high voltage continuously producing power supplying system for supplying high voltage electrical power to an automotive system includes a plurality of components configured to supply the high voltage electrical power to the automotive system and a high voltage power controller configured to receive the high voltage electrical power from the plurality of components. The system further includes an electrical isolation device configured to electrically isolate at least one of the plurality of components. The high voltage power controller is configured to detect that a fault state of the automotive system has occurred and when the detected fault state is detected, the high voltage power controller is configured to trigger the electrical isolation device to disconnect the at least one of the plurality of components from the automotive system.

14 Claims, 4 Drawing Sheets

(51) Int. Cl.
　　 *H02S 10/40* 　　　 (2014.01)
　　 *H02S 50/00* 　　　 (2014.01)

(56) References Cited

U.S. PATENT DOCUMENTS

| | | | | |
|---|---|---|---|---|
| 2023/0173898 | A1* | 6/2023 | Dawson | B60R 16/033 |
| | | | | 296/100.06 |
| 2023/0311597 | A1* | 10/2023 | McKibben | B60L 50/75 |
| | | | | 280/432 |
| 2023/0322088 | A1* | 10/2023 | Ho | H01H 39/006 |
| | | | | 307/10.1 |
| 2024/0258970 | A1* | 8/2024 | Reichert | H02S 40/34 |

FOREIGN PATENT DOCUMENTS

| | | |
|---|---|---|
| KR | 10-2018-0022272 | 3/2018 |
| WO | 2021/070146 | 4/2021 |

* cited by examiner

300

305 High voltage power produced

310 High voltage power received

315 Has a fault state been detected?

No

Yes

320 Electrical isolation of high voltage power source

METHODS AND SYSTEMS FOR ISOLATING A HIGH VOLTAGE CONTINUOUSLY PRODUCING POWER SOURCE

FIELD

The disclosure herein relates to a high voltage continuously producing power source. More particularly, the disclosure herein relates to methods and systems for automotive-type electrical isolation of a high voltage continuously producing power source when a fault state or condition occurs or is detected.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a mass-transit bus, or other similar transport unit). A refrigerated transport unit (e.g., a transport unit with a TRS) is commonly used to transport perishable items such as flowers, pharmaceuticals, produce, frozen foods, and meat products. Typically, the TRS includes a transport refrigeration unit (TRU) that is attached to the transport unit to control an environmental condition (e.g., temperature, humidity, atmosphere, etc.) of the cargo space. The TRU can include, without limitation, a compressor, a condenser, an expansion valve, an evaporator, and fans or blowers to control the heat exchange between the air inside the cargo space and the ambient air outside of the refrigerated transport unit.

Some existing transport units may include a prime mover (e.g., an engine) for generating power for a machine (e.g., generator) that supplies power to components of the transport climate control system, e.g., the TRS. As transport units are trending towards electrification, the power for the components of the transport climate control system may come from a battery source or other electrical power generation source.

SUMMARY

The disclosure herein relates to a high voltage continuously producing power source. More particularly, the disclosure herein relates to methods and systems for automotive-type electrical isolation of a high voltage continuously producing power source when a fault state or condition occurs or is detected.

In an example embodiment, a high voltage continuously producing power source is provided that produces or generates electrical power, e.g., 400-1600 VDC, by including a plurality of components that each produce or generate electrical power at high DC voltages, e.g., greater than 60 VDC based on the Society of Automotive Engineers (SAE) standards or 50 VRMS (root-mean-square voltage) based on Occupational Safety and Health Administration (OSHA) standards, for example, 60 VDC or 60 VRMS, 80 VDC or 80 VRMS, 100 VDC or 100 VRMS, etc. The plurality of components can be connected in series to produce and/or generate the electrical power demanded from the system, e.g., automotive system or vehicle, to improve system efficiency and system design, since many electrical systems can be better configured to convert DC to AC power at higher DC voltages. In non-limiting embodiments, the high voltage continuously producing power sources can include a number of beneficial features over systems that individually produce VDC voltages at lower voltages, e.g., 50 VDC, 40 VDC, 30 VDC, etc. For example, in an embodiment, the present system can use wires that electrically connect the plurality of components, e.g., solar panel array, with reduced diameters, e.g., lower gauge, since wires that transfer higher voltages can be rated for lower amps. In addition, the system can have a reduced number of components needed to step-up electrical power provided at lower DC voltages to higher voltages for use by the automotive system, e.g., DC-DC converters or step-up circuits. In some embodiments, the system can also have a reduced number of wires for electrically connecting the solar panel photovoltaic panels to the system, since there are less components. In an embodiment, the high voltage continuously producing power source can be, for example, a solar charge source (such as, a solar panel, a solar charge controller, etc.), a wind powered charge source, a fuel cell (such as, hydrogen fuel cell, etc.) or a combination thereof. As used herein, while not intending to limit the scope of the disclosure, the high voltage continuously producing power source can be a system or device that can continuously produce high voltage power, even after the automotive system is shut down, such as but not limited to, a solar panel array, wind turbine(s), fuel cell(s), or combination thereof. The high voltage continuously producing power source is not a battery, since batteries are configured to store energy, but are not configured to produce or generate energy, as understood herein. In some embodiments, the high voltage continuously producing power source, such as the solar panel, can be used in combination with other sources of energy, e.g., eAxle, fuel cell, or charged by grid power, etc.

Since the continuous generation of electrical power from high DC voltage systems can impose a safety hazard when a fault state or condition occurs (e.g., critical fault, accident, roll-over, system self-detected faults that indicate a high voltage risk, physical system fault where mechanical, impact, or rapid unplanned disassembly has occurred or has been detected, a fault or risk that has been detected manually, or other detected event that requires rapid system isolation for voltage exposure protection), to first responders, safety personnel, the system operator, or the like who may be exposed to the high voltage power during extraction, aid, recovery, mitigation, and/or repair events, embodiments described herein provide systems and methods for electrically isolating at least one component of the high voltage continuously producing power source to prevent or reduce the risk of high voltage exposure. In some embodiments, interruptible panel string interconnects, e.g., electrical isolation devices, can be used to isolate components of the high voltage continuously producing power source, e.g., solar panel photovoltaic cells, that are connected in series. The interruptible panel string interconnects can be irreversible or reversible isolation devices, including, but not limited to solid state relays or other switch mode devices or pyrotechnical safety switches, pyro fuses, or similar disconnection systems that are configured to electrically isolate the high voltage components, e.g., of solar panel systems, to reduce or prevent the exposure of electrical power to under a predetermined threshold voltage, e.g., under 60 VDC, for example, 50 VDC, 40 VDC, 30 VDC, 24 VDC, 12 VDC, etc. or under 50 VRMS or configurable by the user, e.g., user could determine the levels to be high voltage and require electrical isolation, for each component, when a critical fault, accident, roll-over or other detected event that requires rapid system isolation for voltage exposure protection is detected or occurs.

In an embodiment, a method for electrically isolating a high voltage continuously producing power source is provided. The method includes a high voltage power controller receiving high voltage electrical power from the high voltage continuously producing power source for providing the electrical power to a load in a system and the high voltage power controller detecting whether a fault state of the system that is powered by at least the high voltage continuously producing power source has occurred. The method further includes electrically isolating at least one of a plurality of components of the high voltage continuously producing power source that supplies the electrical power by disconnecting the at least one of the plurality of components of the high voltage continuously producing power source from providing the electrical power to the load of the system, when the detected fault state is detected.

In another embodiment, a high voltage continuously producing power supplying system for supplying high voltage electrical power to an automotive system is provided. The high voltage continuously producing power supplying system includes a plurality of components that supply the electrical power to a load in the automotive system; a high voltage power controller for receiving the electrical power from the plurality of components; and an electrical isolation device configured to electrically isolate at least one of the plurality of components by disconnecting the at least one of the plurality of components from providing the electrical power to the load of the automotive system. The high voltage power controller is configured to detect whether a fault state of the automotive system has occurred and when the detected fault state is detected, the high voltage power controller triggers the electrical isolation device to disconnect the at least one of the plurality of components from the load of the automotive system.

In yet another embodiment, an automotive system is provided. The automotive system includes a solar array that includes a plurality of solar panel photovoltaic cells for supplying high voltage electrical power to a load in the automotive system; a high voltage power controller for receiving the electrical power from the solar array; and an electrical isolation device configured to electrically isolate at least one of the plurality of solar panel photovoltaic cells by disconnecting the at least one of the plurality of solar panel photovoltaic cells from the load in the automotive system. The high voltage power controller is configured to detect whether a fault state of the automotive system has occurred and when the detected fault state is detected, the high voltage power controller triggers the electrical isolation device to disconnect the at least one of the plurality of solar panel photovoltaic cells from the load in the automotive system.

As such, the systems and methods discussed herein, have at least the following advantages:

The ability to isolate specific components of the solar panel array, e.g., solar panel photovoltaic cells and/or strings, so that the maximum voltage for series connected panel strings is below a predetermined threshold, e.g., below 60 VDC, for example, 50 VDC, 40 VDC, 30 VDC, etc. or below 50 VRMS or configurable by the user, e.g., user could determine the levels to be high voltage and require electrical isolation, following a fault state or condition that needs rapid system isolation to protect against high voltage exposure.

The ability to use solar panel photovoltaic cells, e.g., panel strings, that each produce or generate high voltage electrical power, e.g., greater than 60 VDC, 80 VDC, 100 VDC, etc. in order to improve system efficiency and reduce the wire gauge and number of wires for connecting the solar panel array system to the system, e.g., automotive system and/or TRS.

The ability to use small components without mechanical contactors or moving parts for the electrical isolation devices that can fit within the components of the solar panel array and be installed in a low profile configuration.

The ability to use discrete, analog, digital, and/or data signals to rapidly trigger a remote isolation of the electrical isolation device to quickly isolate and prevent or reduce the risk of high voltage exposure. The electrical isolation device can also remain isolated in cases where power is lost to the automotive system for additional high voltage exposure protection.

While the advantages of the system and methods are discussed herein as relating to a solar panel array, it is appreciated that such advantages are also applicable to other high voltage continuously producing power sources.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1:
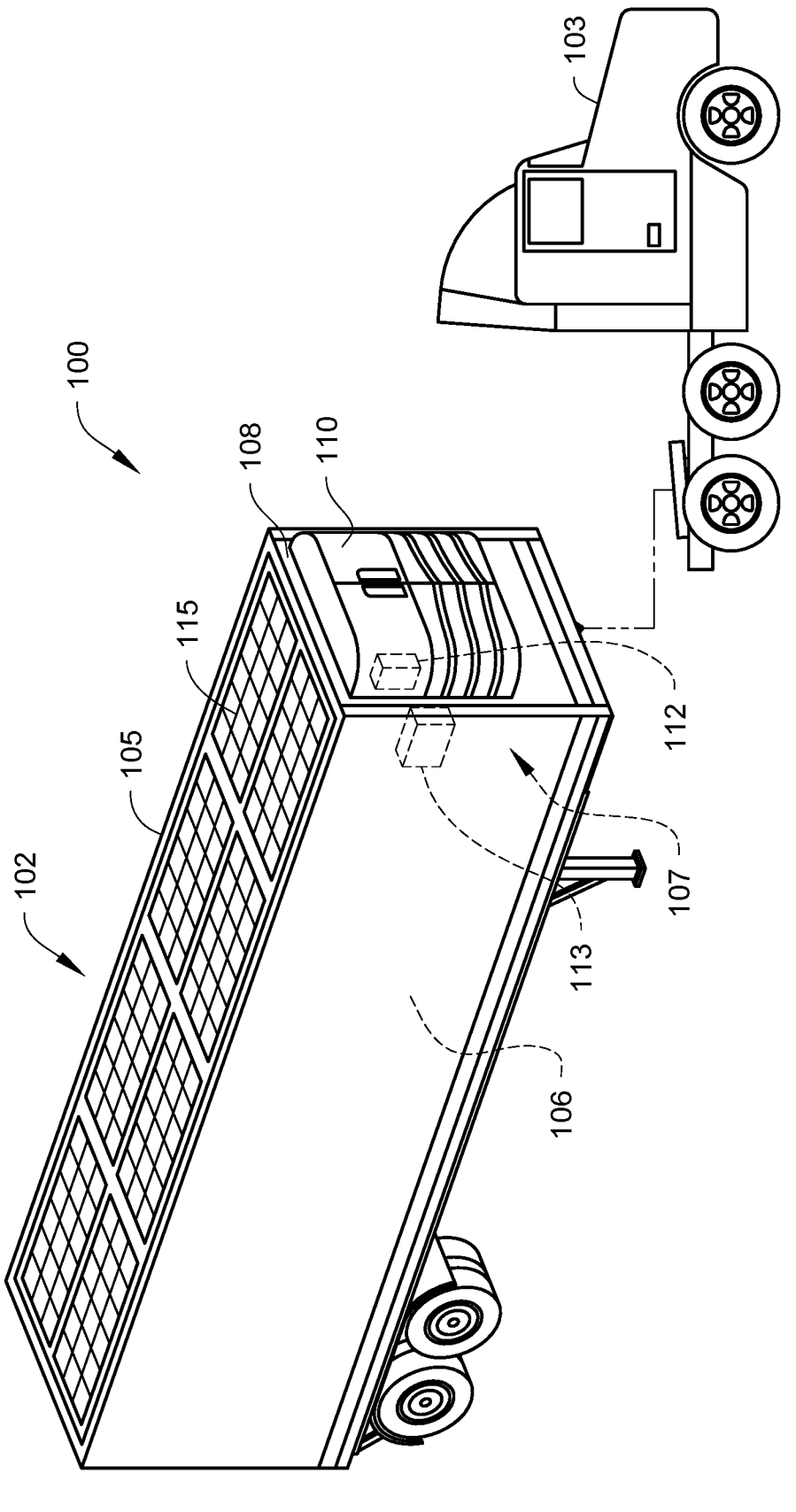
FIG. 1 illustrates a perspective view of a climate controlled transport unit with a transport climate control system and high voltage continuously producing power supplying system attached to a tractor, according to one embodiment.

Embodiments described and/or recited herein may refer to the accompanying drawings; however, such embodiments are non-limiting examples that may be embodied in various other forms, as well. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art how to variously utilize the present disclosure in any appropriately detailed structure. In this description, as well as in the drawings, similarly-referenced numbers represent elements that may perform the same, similar, or equivalent functions.

Additionally, the present disclosure may be described herein in terms of functional block components and various processing steps. It should be appreciated that such functional blocks may be realized by any number of hardware and/or software components configured to perform the specified functions. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation.

The scope of the disclosure should be determined by the appended claims and their legal equivalents, rather than by the examples given herein. For example, the operations or functions recited in any method claims may be executed in any order and not be limited to the sequence presented in the claims. Moreover, no element is essential to the practice of the disclosure unless specifically described herein as "critical" or "essential."

The disclosure herein relates to a high voltage continuously producing power source. More particularly, the disclosure herein relates to methods and systems for automotive-type electrical isolation of a high voltage continuously producing power source when a fault state or condition occurs or is detected.

In an example embodiment, a high voltage continuously producing power source is provided that produces or generates electrical power, e.g., 400-1600 VDC, by including a plurality of components that each produce or generate electrical power at high DC voltages, e.g., 60 VDC, 80 VDC, 100 VDC, etc. The plurality of components can be connected in series to produce and/or generate the electrical power demanded from the system (e.g., automotive vehicle or system), to improve system efficiency and system design, since many electrical systems can be better configured to convert DC to AC power at higher DC voltages. In an example embodiment, the high voltage continuously producing power sources can include a number of beneficial features over systems that individually produce DC voltages at lower voltages, e.g., 50 VDC, 40 VDC, 30 VDC, etc. For example, in an embodiment, the present system can use wires that electrically connect the plurality of components (e.g., solar panel array) with reduced diameters (e.g., gauge), since wires that transfer higher voltages can be rated for lower amps. In addition, the system can have a reduced number of components needed to step-up electrical power provided at lower DC voltages to higher voltages for use by the automotive system, e.g., DC-DC converters or step-up circuits. In some embodiments, the system can also have a reduced number of wires for electrically connecting the solar panel photovoltaic cells and/or panels to the system, since there are less components. In an embodiment, the high voltage continuously producing power source can be, for example, a solar charge source (such as, a solar panel, a solar charge controller, etc.), a wind powered charge source, or a fuel cell (such as a hydrogen fuel cell, etc.), or a combination thereof. As used herein, while not intending to limit the scope of the disclosure, the high voltage continuously producing power source can be a system or device that can continuously produce high voltage power, even after the automotive system is shut down, such as, for example, a solar panel array, a wind turbine(s), a fuel cell(s), or combination thereof. The high voltage continuously producing power source is not a battery, since batteries are configured to store energy, but are not configured to produce or generate energy, as understood herein. In some embodiments, the high voltage continuously producing power source, such as the solar panel, can be used in combination with other sources of energy, e.g., eAxle, fuel cell, or charged by grid power, etc.

Since the continuous generation of electrical power from high DC voltage systems can impose a safety hazard when a fault state or condition occurs, e.g., critical fault, automotive system failure, electrical system failure, or the like, accident, roll-over, system self-detected fault that indicates a high voltage risk, physical system fault where mechanical, impact, or rapid unplanned disassembly has occurred or has been detected, a fault or risk that has been detected manually, or other detected event that requires rapid system isolation for voltage exposure protection, to first responders, safety personnel, the system operator, or the like who may be exposed to the high voltage power during extraction, aid, recovery, mitigation, and/or repair events, embodiments described herein provide systems and methods that are configured to electrically isolate at least one component of the high voltage continuously producing power source to prevent or reduce the risk of high voltage exposure. In some embodiments, interruptible panel string interconnects, e.g., electrical isolation devices, can be used to isolate components of the high voltage continuously producing power source, e.g., solar panel photovoltaic cells, that are connected in series. The interruptible panel string interconnects can be irreversible or reversible isolation devices, including, but not limited to solid state relays or other switch mode devices or pyrotechnical safety switches, pyro fuses, or similar disconnection systems that are configured to electrically isolate the high voltage components, e.g., of solar panel systems, to reduce or prevent the exposure of electrical power to under a predetermined threshold voltage, e.g., under 60 VDC, for example, 50 VDC, 40 VDC, 30 VDC, 24 VDC, 12 VDC, etc. or under 50 VRMS or configurable by the user, e.g., user could determine the levels to be high voltage and require electrical isolation, for each component, when a fault state or condition that requires rapid system isolation for voltage exposure protection is detected or occurs.

In an example embodiment, the high voltage continuously producing power source can be a solar panel array that includes a plurality of solar panel photovoltaic cells for an automotive vehicle, e.g., truck and trailer, van, bus, automobile, train and boxcar, drone, UAV, or the like. The solar panel array is configured to convert solar energy into DC voltage, e.g., absorb sunlight and generate electrical power to supply electrical power to the automotive vehicle.

In some embodiments, the solar panel array can include a plurality of solar panel photovoltaic cells that are each configured to produce and/or generate electrical power at higher DC voltages, e.g., over 60 VDC, 80 VDC, or 100 VDC, etc. The solar panel photovoltaic cells can be panel strings connected in series to produce or generate electrical power at the higher DC voltages, e.g., two 30 VDC generating photovoltaic cells connected in series, or three 20 VDC generating photovoltaic cells connected in series, and/or a single photovoltaic cell configured to generate 60 VDC, which can all be connected in series to produce or generate the high DC voltage, e.g., 400-1600 VDC, for providing electrical power to the automotive system and/or TRS/TCCS, e.g., loads. That is, the system can utilize solar panel arrays with voltages at or over 60 VDC by connecting the photovoltaic cells in series strings to gain efficiency. Such system design is not intended to be limiting, but rather, examples of system designs of the solar panel array, in which other panel string arrangements are included to produce the higher DC voltages, e.g., two 40 VDC generating photovoltaic cells, one 100 VDC generating photovoltaic cells, etc. As such, the solar panel array including the plurality of solar panel photovoltaic cells for producing or generating higher DC voltages, can have improved system efficiency and system design, as discussed above.

In some embodiments, the solar panel array can be designed to provide the high voltage panel string array to provide 400-1600 VDC electrical power to the system, for maximum efficiency and installation/system design, while being configured to prevent or reduce the risk of high voltage exposure in cases of a fault state or condition being present, e.g., configured to isolate the solar panel array and/or components, e.g., strings or sub-strings, such that electrical power generation and/or transmission is under a predetermined threshold, e.g., 60 VDC. For example, in some embodiments, the electrical isolation device can be provided between the series-connected solar panel photovoltaic cells or panel strings or sub-strings, e.g., along the wiring connecting the solar panel photovoltaic cells in series, such that when a fault state or condition is detected, any part of the solar panel array or panel string that generates or produces high voltage electrical power can be disconnected. That is, by having at least one electrical isolation device in a series string of three 20 VDC generating photovoltaic cells, the triggering of the electrical isolation device can reduce the generation of electrical power to under 60 VDC, e.g., at least one of the photovoltaic cells is not connected in series with the remaining photovoltaic cells. As such, the system is configured to isolate series wiring and separate connections at solar panels or strings or sub-strings based on event-based detection, e.g., the fault state or condition, to lower the exposed electrical power to voltages of less than the predetermined threshold, e.g., 60 VDC or 50 VRMS, in situations where the solar panel array is still exposed to the sun and is unable to be turned off when there may be intended or unintended access or exposure. It is understood that the RMS voltage can relate to either peak voltage, peak-to-peak voltage or average voltage of the system.

That is, while in some cases, an individual solar panel array having photovoltaic cells that each generate or produce electrical power at a voltage of 50 VDC or between 35 to 45 VRMS may not require isolation during a fault state or condition, if the photovoltaic cell that generates electrical power at 50 VDC is connected in series, e.g., four photovoltaic cell panels, a 200 VDC panel string can be created. If there is a fault state or condition, e.g., an accident or roll-over, the system may continue to produce high voltage even if disconnected from the balance of the system that provides power to the automotive system or loads therein which can impose a safety hazard or risk of high voltage exposure. However, by including electrical isolation devices between the series-connected solar panel photovoltaic cells and/or panel strings that electrically isolate or disconnect the photovoltaic cells, panel strings, or sub-strings that produce and/or generate electrical power at high voltages, the system can be rendered safe by preventing or reducing the risk of high voltage exposure, e.g., voltages of 60 VDC or 50 VRMS or higher, by first responders, safety personnel, or operators during extraction, aid, recovery, mitigation, and/or repair events.

In some embodiment, the electrical isolation device can include one or more of solid state switching devices or relays and/or pyrotechnic or pyro fuses that can be remotely triggered or automatically triggered by the occurrence of the fault state or condition, e.g., critical fault, roll-over, or accident. In some embodiments, the electrical isolation device can be configured to provide a mechanical disconnect, e.g., switch, relay, or fuse, in which once triggered, the electrical isolation device needs replacement, e.g., fuse, or be manually reset, e.g., switch, with local and intentional methods, e.g., at the automotive vehicle. That is, the electrical isolation devices are not be intended or permitted to be reset via an automated control system or lose isolation in cases where power was removed, e.g., fail closed switches, but are manually resettable or physically replaceable so that permanent isolation remains after the isolation event, e.g., fault state or condition, is triggered.

In some embodiments, the electrical isolation device can be one or more pyrotechnic fuses and/or other permanent electrical isolation devices. It is appreciated that pyrotechnic fuses or other thermally activated fuses are cost effective and can react quickly, e.g., thermal event, when the fault state or condition occurs or is detected. Furthermore, pyrotechnic fuses or pyro fuses have low space profiles, are easily insertable into solar panel arrays and panel strings, and/or can be configured to be triggered remotely or locally activated, e.g., triggering event detection, such as, an accelerometer.

FIG. 1 illustrates one embodiment of an automotive system that includes a transport climate control system 100 for a climate controlled transport unit 102 attached to an automotive vehicle, such as, a tractor 103. The climate controlled transport unit 102 includes the transport climate control system 100 for a transport unit 105. The tractor 103 is attached to and is configured to tow the transport unit 105. The transport unit 105 shown in FIG. 1 is a trailer. It will be appreciated that the embodiments of the automotive vehicle described herein are not limited to tractor and trailer units, but can apply to any type of transport unit (e.g., a truck, a container (such as a container on a flat car, an intermodal container, a marine container, etc.), a van, drone, UAV, a shuttle bus, a boat, an airplane, a sweeper, a dump truck, a box car, an ambulance, a semi-tractor, a bus, or other similar transport unit, etc.).

The transport climate control system 100 includes a transport climate control unit (TCCU) 110 that provides environmental control (e.g. temperature, humidity, air quality, etc.) within a climate controlled space 106 of the transport unit 105. The transport climate control system 100 also includes a programmable climate controller 107 and one or more sensors (not shown) that are configured to measure one or more climate control parameters of the transport climate control system 100 (e.g., an ambient temperature outside of the transport unit 105, a space temperature within the climate controlled space 106, an ambient humidity outside of the transport unit 105, a space humidity within the climate controlled space 106, a door opening event of the transport unit 105, a temperature of the cargo within the climate controlled space 106, etc.) and communicate climate control parameter data to the climate controller 107.

The TCCU 110 is disposed on a front wall 108 of the transport unit 105. In other embodiments, it will be appreciated that the TCCU 110 can be disposed, for example, on a rooftop or another wall of the transport unit 105. The TCCU 110 includes a climate control circuit that connects, for example, a compressor, a condenser, an evaporator and an expansion valve to provide conditioned air within the climate controlled space 106.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the transport climate control system 100 including the transport climate control circuit.

The transport climate control system for the climate controlled transport unit 102 can be powered by a power system that includes a continuous energy power network, e.g., solar panel array 115, and one or more of a stored energy power network (not illustrated) and a prime mover power network (not illustrated). The solar panel array 115 can include a plurality of solar panel photovoltaic cells that is configured to convert solar energy into DC voltage, e.g., absorb sunlight from the sun and generate electrical power therefrom. Each of the solar panel photovoltaic cells can be configured to produce a predetermined amount of DC voltage, e.g., 40, 50, 60, 80, 100 VDC, and connected in series as strings or panel strings with the other solar panel photovoltaic cells for supplying electrical power at high voltages, e.g., 60, 80, 100 VDC, etc., to generate or supply electrical power at 400 to 1600 VDC for powering the TCCS and/or automotive system. As the solar panel array 115 relies on the amount of light energy captured from the sun, the electrical power generated and outputted by the solar panel array 115 can vary. The variable electrical power outputted by the solar panel array 115 can be sent to a high voltage power controller, as discussed further below in detail. While FIG. 1 shows eight solar panel photovoltaic cells, it will be appreciated that the solar panel array 115 can include any number of solar panel photovoltaic cells, e.g., 1, 2, 3, 4, 8, 12, or 20 solar panel photovoltaic cells. While the solar panel photovoltaic cells are discussed above as producing 40 to 100 VDC, it is understood that each of the solar panel photovoltaic cells can be configured to produce higher or lower amounts of DC voltage based on the panel design. In an embodiment, the panel design can include an array of photovoltaic cells connected in series as strings or substrings forming the solar panel photovoltaic cells for producing 60 to 400 VDC.

Figure 2:
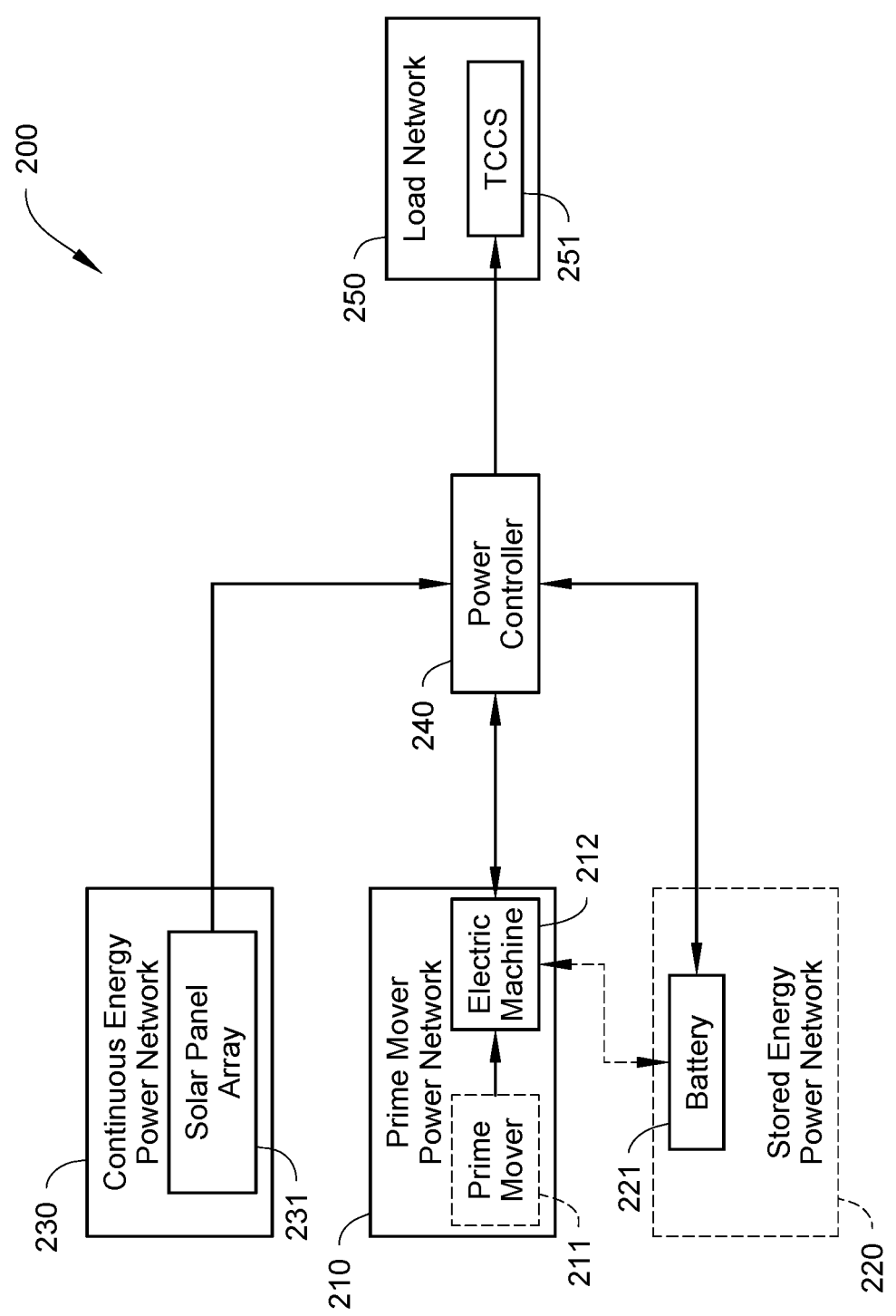
FIG. 2 illustrates a block diagram of a power system, according to one embodiment.

FIG. 2 illustrates a block diagram of a power system 200 for providing electrical power to the transport climate control system 100 and/or the automotive system of FIG. 1, according to an embodiment. The power system 200 can include one or more prime mover power networks 210, one or more stored energy power networks 220, one or more continuous energy power networks 230, one or more utility power networks (not shown), one or more high voltage power controllers 240, or any combinations thereof. The power system 200 can use one or more of the prime mover power network 210, the stored energy power network 220, the continuous energy power network 230, and the utility power network at any given time to provide power to a load network 250 that can include the transport climate control system 251 and/or the automotive vehicle. The power system 200 can be configured to be a hybrid power system that is powered by the prime mover power network 210 in combination with the stored energy power network 220 and/or the utility power network and/or the continuous energy power network 230. In an embodiment, the power system 200 can be configured as a fully electric power system that does not include a prime mover in the prime mover power network 210 but includes the electric machine 212 to provide power to the transport climate control system 251, e.g., an electrified system that is powered by the stored energy power network 220 and/or the continuous energy power network 230.

In an embodiment, the prime mover power network 210 can include a prime mover 211 and an electric machine 212 that can provide electric power to the high voltage power controller 240 and/or the stored energy power network 220. The prime mover 211 is configured to generate mechanical power and the electric machine 212 is configured to convert the mechanical to electric power, e.g., an electromechanical energy converter. The generated electric power is then sent by the prime mover power network 210 to the power controller 240 and/or the stored energy power network 220. In some embodiments, the prime mover 211 can be a vehicle prime mover, e.g., engine, used to move the automotive vehicle that also provides power to the transport climate control system 251 in load network 250 when available. In other embodiments, the prime mover 211 and the electric machine 212 can be part of a generator set that provides power to the transport climate control system 251 in the load network 250 and/or the stored energy power network 220.

In some embodiments, the electric machine 212 can be an electrical generator that can provide DC power to the transport climate control system 251 in the load network 250. In some embodiments, the electric machine 212 can include an alternator, a regulator, e.g., a DC regulator, and a rectifier or an AC-DC converter (not shown) that rectifies or converts the AC power generated by the electric machine 212 to a DC power.

It is appreciated that when the automotive vehicle is an electric vehicle, there may be no prime mover 211. The electric machine can be a motor generator that is used with electrical power at a high voltage (e.g., greater than 60 VDC, for example, in a range between 60 VDC and 1500 VDC; for example, 400 VDC, 800 VDC, etc.) DC battery to run the automotive vehicle. Electric vehicles can also provide a relatively high voltage (e.g., 400 V, 800 V, etc.) DC power source (e.g., a battery pack, a rechargeable energy storage system (RESS), etc.). Electric vehicles can include one or more DC-DC converters (e.g., two DC-DC convertors) to convert the electrical power at relatively high voltage (e.g., 400 VDC, 800 VDC, etc.) to a low voltage (e.g., in a range between 0 VDC and 60 VDC; for example, 12 VDC). That is, the electric machine 212 can be replaced with a DC-DC converter having similar parameters as the electric machine in order to be able to provide prime mover network 210 power to the power controller 240.

The stored energy power network 220 can include an energy storage source, e.g., battery 221, and an energy storage management system (not shown). In some embodiments, the stored energy power network 210 can be part of the transport climate control system 251 and can be housed within a TCCU. In other embodiments, the stored energy power network 220 can be external to the transport climate control system 251 and part of the prime mover power network 210 and/or the electric machine 212. In yet some other embodiments, the stored energy power network 220 can be external to the transport climate control system 251 and external to the prime mover power network 210.

In some embodiments, the energy storage source can include one or more batteries 221. For example, in one embodiment the energy storage source can include two batteries (not shown). Each of the batteries 221 can also be connected to the power controller 240. It will be appreciated that the energy storage source can provide sufficient energy to power the transport climate control system 251 in the load network 250 and/or the automotive vehicle by itself. In some embodiments, the energy storage source can provide 12 VDC or 24 VDC. In other embodiments, the energy storage source can provide 48 VDC. In some embodiments, a step-up converter or boost converter may be used to increase the voltage from the energy storage source to 400, 800, or 1600 VDC for providing electrical power to the power controller 240 and/or the automotive vehicle, e.g., electric machine 212.

In some embodiments, the continuous energy power network 230 can include a high voltage continuously producing power source, such as, a solar panel array 231, which can be the same as the solar panel array 115 in FIG. 1, to provide electric power to the high voltage power controller 240 to supply high voltage electrical power to the transport climate control system 251 of the load network 250 and/or the stored energy power network 220 and/or another load, e.g., the electric machine 212, energy consumer, such as accessories, lights, etc. As used herein, while not intending to be limiting, the continuous energy power network 230 can include any high voltage continuously producing power source that continuously produces high voltage power to the automotive system, such as, a solar panel array, wind turbine, fuel cell, or combination thereof, even after the automotive system is shut down. For example, since the solar panel array includes photovoltaic cells, the conversion of sunlight to energy does not stop unless sunlight is no longer provided to the solar panel, even if the automotive vehicle is not operating. In some embodiments, the high voltage continuously produc-ing power source, such as the solar panel, can be used in combination with other sources of energy, e.g., eAxle, fuel cell, or charged by grid power, etc.

In some embodiments, the high voltage power controller 240 can be configured to convert power from any one of the prime mover power network 210, the stored energy power network 220, and the continuous energy power network 230 to a load power compatible with one or more loads of the transport climate control system 251 in the load network 250 and/or the automotive vehicle. That is, the power controller 240 is configured to buck or boost power from the prime mover power network 210 and/or is configured to buck or boost power from the stored energy power network 220 and/or the continuous energy power network 230 to obtain the desired load power. In some embodiments, the power controller 240 can include one or more of a number of different components. In some embodiments, the power controller 240 can include a power distribution module, a multi-channel drive system inverter that includes one or more DC/DC converters, DC/AC inverters, one or more DC/DC converters or one or more DC/AC inverters, and a system controller that is configured to control the system. The system controller can be configured to control, e.g., components of the automotive system or the TRS, such as the climate controller 107 of FIG. 1, and/or an accident, hazard, or impact detection system or interface. The power controller 240 can also include telematics devices including but not limited to one or more of devices to track movement and/or provide communications with the user or customer via the Internet, cellular, etc., such as, for example, a GPS module, RF transceivers, USB interface, WiFi communica-tions module, cellular communications modules, or other Internet access and communication modules. In an embodi-ment, the power controller 240 can include a DC/DC con-verter to convert the power generated by the prime mover power network 210 and/or the continuous energy power network 230 to a voltage compatible with one or more loads of the transport climate control system 251 in the load network 250 and a second DC/DC converter to convert the stored energy power network 220 to a voltage compatible with one or more loads of the transport climate control system 251 in the load network 250 and/or the stored energy power network 220.

In some embodiments, the utility power network is con-figured to charge the energy storage source 221 of the stored energy power network 220 (or the electric vehicle) when, for example, the automotive vehicle is parked and has access to a utility power source. In some embodiments, the utility power network can also provide power to operate the transport climate control system 251 in the load network 250 when, for example, the automotive vehicle is parked and has access to a utility power source. The utility power network includes the AC-DC converter. The utility power source (e.g., shore power, etc.) can be connected to the AC-DC converter to provide AC power input to the AC-DC con-verter. The AC-DC converter is configured to convert the AC power from the utility power source and to provide con-verted DC power to the power controller 240.

In some embodiments, the power controller 240 can also be configured to regulate the voltage and/or current from at least the continuous energy power network 230 to convert or control the electrical power to charge the battery 221 in the stored energy power network 220. In other embodiments, the power controller 240 can be configured to regulate the voltage and/or current from at least one of the continuous energy power network 230 or the stored energy power network 220 to provide power to the electric machine 212, e.g., when the automotive vehicle is an electric vehicle.

As discussed in more detail below, the power system 200 is configured to electrically isolate any portion or all por-tions of the continuous energy power network 230 that provides high voltage electrical power from a high voltage power source, e.g., a solar charge source, such as, a solar panel, a solar charge controller, etc., wind turbine, or a fuel cell, such as, hydrogen fuel cell, or a combination thereof, to protect against high voltage exposure, when a fault state or condition occurs or is detected that can result in risk of high voltage exposure. In an embodiment, the continuous energy power network 230 can include electrical isolation devices, such as, solid state relays or other switch mode devices, pyrotechnical safety switches, pyro fuses, or similar discon-nection systems such that any components or series con-nected components that produce the high voltage power in the continuous energy power network 230 can be discon-nected. In an embodiment, the term high voltage can refer to voltages higher than 60 VDC or 50 VRMS, higher than 80 VDC, or higher than 100 VDC. In some embodiments, the fault state or condition can include, but not limited to, a critical fault, e.g., automotive system failure, electrical sys-tem failure, or the like, accident, roll-over event, system self-detected faults that indicate a high voltage risk, physical system fault where mechanical, impact, or rapid unplanned disassembly has occurred or has been detected, a fault or risk that has been detected manually, or other detected event that requires rapid system isolation to protect against high volt-age exposure. In some embodiments, the detection of the fault state or condition can be based on other systems to trigger electrical isolation of at least one of the components of the high voltage continuously producing power source, such as, the photovoltaic cells. In some embodiments, the other systems can remain operational to continuingly charge the battery.

Figure 3:
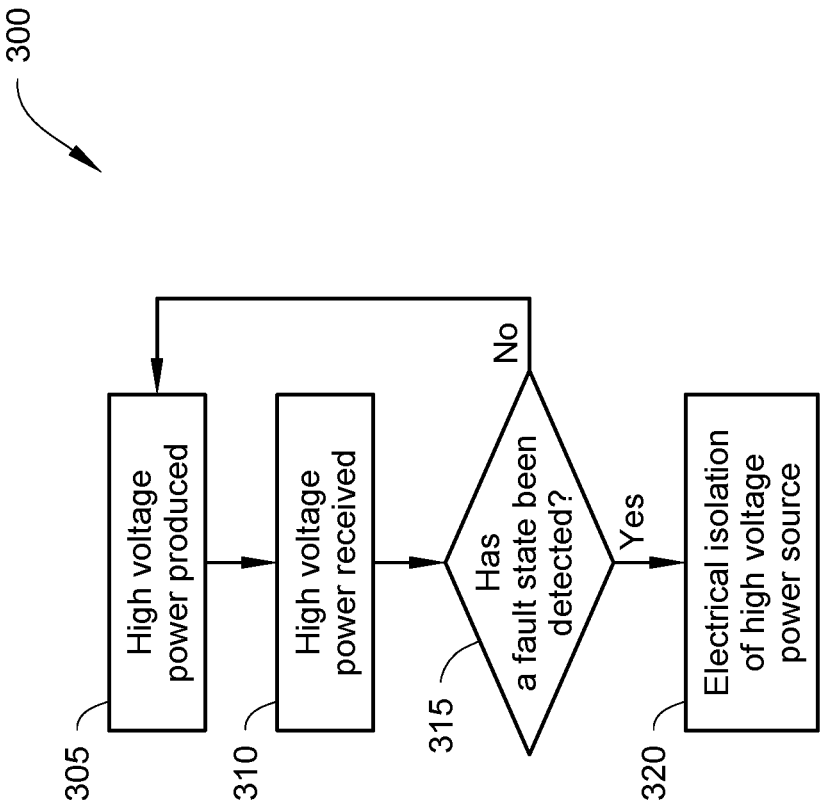
FIG. 3 illustrates a flow chart of a method for isolating a high voltage continuously producing power source, according to one embodiment.

FIG. 3 illustrates a flow chart of a method 300 for electrically isolating a high voltage continuously producing power source, e.g., the solar panel array 115 shown in FIG. 1, the continuous energy power network 230 shown in FIG. 2, etc., according to an embodiment.

At 305, a high voltage continuously producing power source that includes a plurality of components is configured to generate or produce high voltage electrical power. In an embodiment, the high voltage continuously producing power source can be a solar panel array, e.g., the solar panel array 115 shown in FIG. 1 that includes photovoltaic cells connected in series, that absorbs sunlight and generates electrical power from the absorbed sunlight, to supply high voltage electrical power to the automotive system and/or a transport climate control system of the load network and/or a stored energy power network and/or another load, e.g., the electric machine. As used herein, while not intending to be limiting, the high voltage continuously producing power source can include any high voltage continuously producing power source that continuously produces high voltage power to the automotive system, such as, a solar panel array, wind turbine, fuel cell, or combination thereof, even after the automotive system is shut down. In some embodiments, the high voltage continuously producing power source, such as the solar panel, can be used in combination with other sources of energy, e.g., eAxle, fuel cell, or charged by grid power, etc. The method 300 then proceeds to 310.

At 310, a high voltage power controller, e.g., the high voltage power controller 240 shown in FIG. 2, receives the high voltage power generated by the high voltage continuously producing power source. The high voltage power controller can be configured to convert power from the high voltage continuously producing power source to a load power compatible with one or more loads of the transport climate control system in the load network and/or the automotive system. That is, the power controller is configured to buck or boost power from the high voltage continuously producing power source to obtain the desired load power. In some embodiments, the power controller can include one or more of a number of different components. In some embodiments, the power controller 240 can include a power distribution module, a multi-channel drive system inverter that includes one or more DC/DC converters, DC/AC inverters, one or more DC/DC converters or one or more DC/AC inverters, and a system controller that is configured to control the system. The system controller can be configured to control, e.g., components of the automotive system or vehicle or the TRS, such as the climate controller 107 of FIG. 1, and/or an accident, hazard, or impact detection system or interface. The power controller 240 can also include telematics devices including but not limited to one or more of devices to track movement and/or provide communications with the user or customer via the Internet, cellular, etc., such as, for example, a GPS module, RF transceivers, USB interface, WiFi communications module, cellular communications modules, or other Internet access and communication modules. In an embodiment, the power controller can include a DC/DC converter to convert the power generated by the high voltage continuously producing power source to a voltage compatible with one or more loads of the transport climate control system in the load network and a second DC/DC converter to convert the stored energy power network to a voltage compatible with one or more loads of the transport climate control system in the load network and/or the stored energy power network. The method 300 then proceeds to 315.

At 315, the high voltage power controller is configured to detect whether a fault state or condition of the automotive system that is powered by at least the high voltage continuously produce power source has occurred or whether a fault state or condition is detected. In some embodiments, the fault state or condition can include, but not limited to, a critical fault, accident, roll-over event, system self-detected faults that indicate a high voltage risk, physical system fault where mechanical, impact, or rapid unplanned disassembly has occurred or has been detected, a fault or risk that has been detected manually, or other detected event that requires rapid system isolation to protect against high voltage exposure. If the high voltage power controller does not detect that a fault state or condition has occurred, e.g., "NO," the method returns to 305 and the high voltage electrical power continues to be generated or produced. In some embodiments, the fault state or condition can be detected using an accident, hazard, or impact detection system or an interface included on the automotive system. For example, in some embodiments, an accident, hazard, or impact can be detected using one or more of an inclinometer, an accelerometer, a gyroscope, in which if a triggering event occurs or is detected, e.g., rapid deceleration, automotive vehicle orientation or angular velocity or rotational speed exceeds a threshold value, or the like, the high voltage power controller can receive a signal of the fault state or condition of the automotive system, e.g., CAN bus signal to detect roll-over event. If the high voltage power controller detects a fault state or condition of the automotive system, e.g., receives a signal of the fault state or condition of "YES", the method proceeds to 320.

At 320, at least one of the plurality of components of the high voltage continuously producing power source that supplies the electrical power is disconnected. In some embodiments, an electrical isolation device can be provided between each of the plurality of components that are connected in series, such that any of the components that produces a voltage over a predetermined voltage threshold, e.g., higher than 40 VDC, 50 VDC, 60 VDC, 80 VDC, 100 VDC, etc., individually or grouped in series, is disconnected to protect against high voltage exposure, e.g., due to the fault state or condition detected event. In some embodiments, the electrical isolation device can be configured to irreversibly or reversibly disconnect the plurality of components. In some embodiments, the electrical isolation device that irreversibly disconnects the plurality of components can be a pyrotechnical switch, a pyro fuse, or similar permanent isolation device. In some embodiments, the high voltage power controller can be configured to send a signal to the pyrotechnical switch, the pyro fuse, or similar permanent isolation device to trigger the activation of the electrical isolation device, e.g., thermal or mechanical event that opens the fuse. When the electrical isolation device is configured to irreversibly disconnect the plurality of components, the electrical isolation device can be replaced or repaired to continue operation of the high voltage continuously producing power source. In some embodiments, the electrical isolation device that reversibly disconnects the plurality of components can be a solid state switching device, solid state relay, or other switch mode devices that is triggered to open the switch or relay to disconnect at least one of the plurality of components, e.g., components that are configured to produce or generate higher than 60 VDC, higher than 80 VDC, or higher than 100 VDC. Such electrical isolation device can then be configured to be manually resettable. That is, the electrical isolation devices as described herein are configured to isolate the high voltage continuously producing power source after the fault state isolation event is triggered, e.g., a permanent isolation until the electrical isolation device is manually reset or physically replaced. In some embodiments, the triggering of the electrical isolation device can be configurable by the user, e.g., the user can determine the level for triggering electrical isolation. It is appreciated that while the electrical isolation device has been discussed as receiving a signal for triggering the disconnection of the device, the triggering of the disconnection can also be automatic. For example, in an embodiment, a mechanical switch can be provided that triggers the activation of the electrical isolation device, e.g., a limit switch, impact sensor, or float switch, e.g., mercury switch or tilt switch. It is also appreciated that in some embodiments, the triggering of the disconnection of the electrical isolation device may be remote, e.g., operator or automotive fleet controller can remotely trigger electrical isolation, when a fault state or condition is detected, e.g., operator of automotive vehicle is non-responsive or accident has been detected and sent to the automotive fleet controller. In some embodiments, the high voltage continuously producing power source, such as the solar panel, can be used in combination with other sources of energy, e.g., eAxle, fuel cell, or charged by grid power, etc., in which even if the fault state or condition is triggered, the other sources of energy can remain functional to charge the battery, e.g., even when the solar panel array is found to be in a fault state or condition.

When the electrical isolation device irreversibly disconnects one or more of the plurality of components, the high voltage continuously producing power source can return to 305 to generate or produce high voltage electrical power, after the electrical isolation device is repaired or replaced. When the electrical isolation device reversibly disconnects one or more of the plurality of components, the high voltage continuously producing power source can return to 305 to generate or produce high voltage electric power, after the electrical isolation device is manually reset. That is, the electrical isolation devices are not be intended or permitted to be reset via an automated control system or lose isolation in cases where power was removed, e.g., fail closed switches, but are manually resettable or physically replaceable so that permanent isolation remains after the isolation event, e.g., fault state or condition, is triggered.

Figure 4:
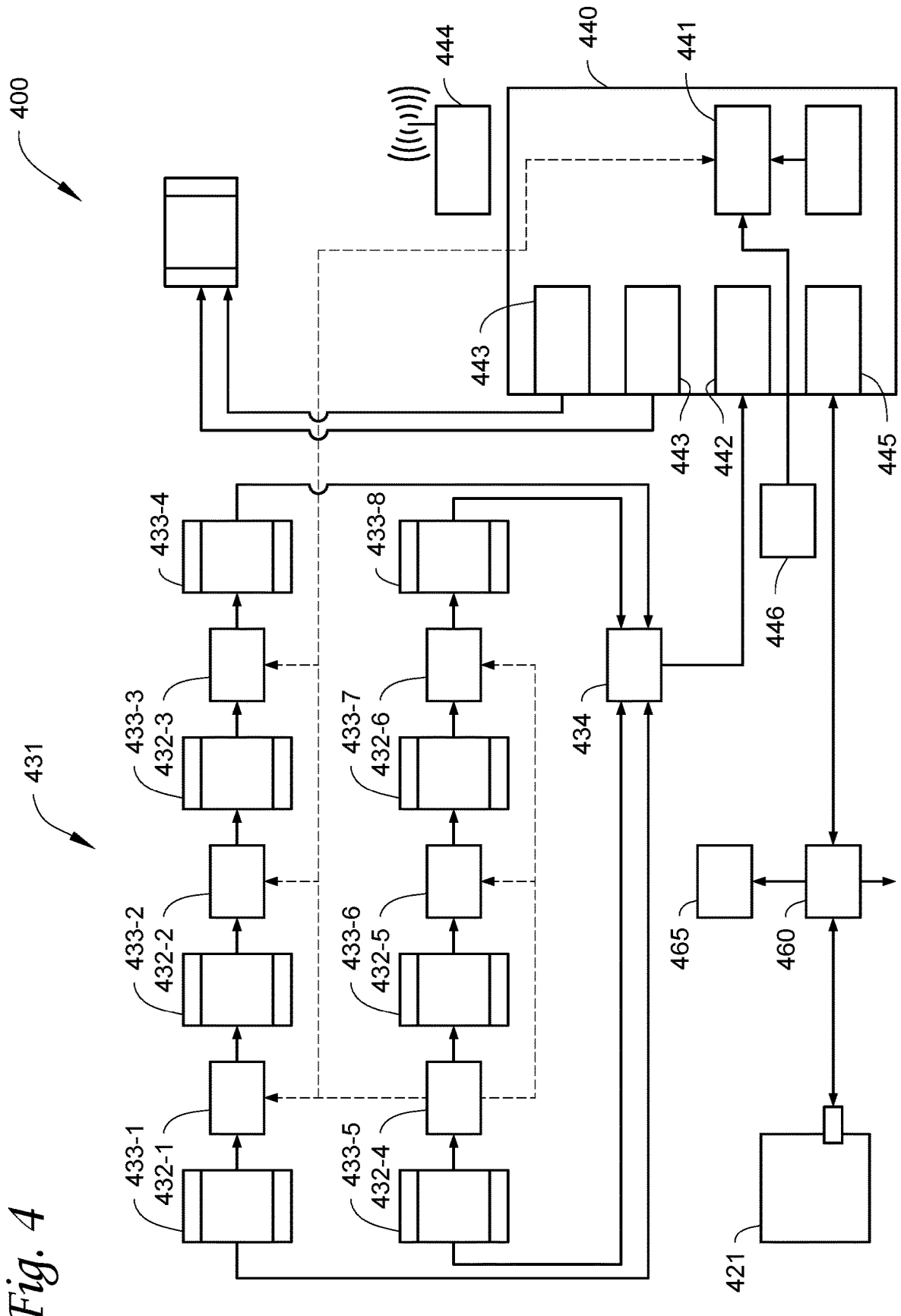
FIG. 4 illustrates a block diagram of a power system with electrical isolation devices, according to one embodiment.

FIG. 4 illustrates a power system 400 that can be used in an automotive system, such as tractor and trailer unit 103 of FIG. 1, having the power system 200 of FIG. 2 and that uses the method 300 of FIG. 3. The power system can include a solar panel array 431 as a high voltage continuously producing power source, such as the solar panel array 231 of FIG. 2, a battery 421 as an energy storage source, such as the battery 221 of FIG. 2, and a high voltage power controller 440, such as the high voltage power controller 240 of FIG. 2, according to one embodiment. The power system 400 can be configured to electrically isolate at least one of a plurality of solar panel photovoltaic cells of the solar panel array 431 that provides high voltage electrical power when a fault state or condition of the automotive system is detected to protect against high voltage exposure, for example, to render the power system 400 safe for access to first responders, safety personnel, the system operator, or the like who may be exposed to the high voltage power during extraction, aid, recovery, mitigation, and/or repair events due to the fault state or condition, e.g., accident or roll-over event, as discussed above.

Without intending to be bound by theory, in some embodiments, solar panel arrays may optimally operate at higher DC voltages, e.g., via series connected panel strings or substrings of photovoltaic cells, since it is easier for electronics to convert DC to AC at higher DC voltages. While in some embodiments solar panels can be built at lower DC voltages, e.g., under 40 VDC, 50 VDC, or 60 VDC, additional wires may be required and additional components may be needed, such as, a DC-DC converter, e.g., step-up circuit, to convert the electrical power at lower DC voltages to higher voltages, e.g., 400-1600 V, demanded from the system to supply electrical power to the necessary load, e.g., charge batteries, supply power, etc. As such, the solar panel array 431 as discussed herein includes high voltage producing solar panel photovoltaic cells, e.g., that each generate or produce electrical power at voltages greater than 60 VDC, 80 VDC, or 100 VDC, that are connected in series to generate higher voltage DC electrical power to supply to the system, e.g., 400 to 1600 VDC.

Referring back to FIG. 4, the solar panel array 431 can include a plurality of components, e.g., solar panel photovoltaic cells 433-1, . . . , 433-8, that are connected in series with a DC combiner 434 that is configured to control and/or combine the DC voltage power from the plurality of solar panel photovoltaic cells 433-1, . . . , 433-8. The DC combiner 434 can be a DC switchboard or panel box that includes one or more of monitoring devices, e.g., to measure voltage, current, temperature, etc., fuse disconnectors with fuse links, surge protection devices, and/or switches for combining or controlling the connection of the panel strings or sub-strings of solar panel photovoltaic cells in series connection. Between the serial connected solar panel photovoltaic cells 433-1, . . . , 433-8, for example, on the electrical wiring supplying the produced or generated electrical power from the photovoltaic cells, at least one (or plurality of) electrical isolation device 432-1, . . . , 432-6 is provided that is configured to electrically isolate at least one of a plurality of solar panel photovoltaic cells 433 to prevent or mitigate the exposure of high voltage electrical power when a fault state or condition of the automotive system is detected, for example, to render the power system 400 safe for access by first responders, safety personnel, and/or the operation during extraction, aid, recovery, mitigation, and/or repair events due to the fault state or condition, e.g., accident or roll-over event. In some embodiments, the electrical isolation device 432-1, . . . , 432-6 can be included in any of the panel strings or sub-strings of the solar panel photovoltaic cells 433-1, . . . , 433-8 that have a series connected voltage greater than a predetermined threshold value, e.g., 60 VDC, 80 VDC, or 100 VDC. For example, the solar panel photovoltaic cells 433-1, . . . , 433-8 can be configured to have various electrical connections based on system design, e.g., two 20 VDC panel strings, three 30 VDC panel strings, one 60 VDC panel string, etc. As such, one of the electrical isolation device 432-1, . . . , 432-6 can be provided between the two 20 VDC panel string and one 30 VDC panel string, e.g., which are connected in series to form a 70 VDC panel string, to disconnect at least a part of the panel string from the power system 400 to prevent or mitigate the risk of high voltage exposure by the panel string in the case that a fault state or condition has occurred or is detected. It is understood that the above disclosure is not intended to be limiting, and any arrangement of the electrical isolation device 432-1, . . . , 432-6 between the solar panel photovoltaic cells 433-1, . . . , 433-8 is included herein.

In some embodiments, the electrical isolation devices 432-1, . . . , 432-6 can be configured to irreversibly or reversibly disconnect at least one of the plurality of solar panel photovoltaic cells 433-1, . . . , 433-8 to electrically isolate the high voltage solar panel photovoltaic cells to under 60 VDC or 50 VRMS in times of a fault state or condition, e.g., critical fault, accident, or other detected event that requires rapid system isolation for protection against high voltage exposure. In some embodiments, the electrical isolation device that irreversibly disconnects the plurality of components can be a pyrotechnical switch, a pyro fuse, or similar permanent isolation device. In some embodiments, the high voltage power controller 440 can be configured to send a signal to the pyrotechnical switch, the pyro fuse, or similar permanent isolation device to trigger the activation of the electrical isolation device 432-1, . . . , 432-6, e.g., thermal or mechanical event that opens the fuse.

When the electrical isolation device 432-1, . . . , 432-6 is configured to irreversibly disconnect the solar panel voltaic cells 433-1, . . . , 433-8, the electrical isolation device 432-1, . . . , 432-6 can be replaced or repaired to continue operation of the solar panel array 431. In some embodiments, the electrical isolation device that reversibly disconnects the solar panel photovoltaic cells can be a solid state switching device, solid state relay, or other switch mode devices that is triggered to open the switch or relay to disconnect at least one of the solar panel photovoltaic cells or panel string, e.g., that produces or generates electrical power at a voltage greater than, e.g., 60 VDC. Such electrical isolation device 432-1, . . . , 432-6 can then be configured to be manually resettable. That is, the electrical isolation devices 432-1, . . . , 432-6 as described herein are configured to isolate at least one component of the solar panel array 431 after the fault state isolation event is triggered, e.g., a permanent isolation until the electrical isolation device is manually reset or physically replaced. It is appreciated that while the electrical isolation device has been discussed as receiving a signal for triggering the disconnection of the device, the triggering of the disconnection can also be automatic. For example, in an embodiment, a mechanical switch or shunt trip circuit breaker can be provided that triggers the activation of the electrical isolation device, e.g., a limit switch, impact sensor, float switch, e.g., mercury switch or tilt switch, or external signal. It is also appreciated that in embodiments that include the electrical isolation device 432-1, . . . , 432-6 as a solid state switching device, solid state relay, or other switch mode device, such device can allow the configuration or design of the solar panel array 431 to switch isolation or voltages, e.g., different panel string configurations.

The high voltage power controller 440 can be configured to receive power from the battery 421 or the solar panel array 431 and convert the received power to a load power compatible with one or more loads of the transport climate control system 451 or other AC accessory application or the automotive vehicle. That is, the power controller 440 is configured to buck or boost power to obtain the desired load power. In some embodiments, the power controller 440 can be a multi-channel drive system inverter that includes a processor-enabled control system 441, a DC/DC converter 442, two DC/AC inverters 443, and a DC bus 445. The DC/DC converter 442 can be a maximum power point tracking converter to convert the power generated by the solar panel array 431 to a voltage compatible with one or more loads of the transport climate control system 451, e.g., a step-up or step-down converter. It will be appreciated that in other embodiments, the power controller 440 can include two or more DC/DC converters 442. The DC/AC inverters 443 can be DC/AC inverters configured to convert the DC voltage power into AC power as the power supply to the TCCS and/or other AC accessory applications. It will be appreciated that in other embodiments, the power controller 440 can include a single DC/AC inverter 443 or can include three or more DC/AC inverters 443. In some embodiments, a telematics device 444 can be connected to or be a component of the power controller 440. The telematics device 444 can include, but is not limited to, GPS technology or the like to track movement and/or providing communications with the user or customer via the Internet, cellular, and can include a GPS module, RF transceivers, USB interface, WiFi communications module, cellular communications modules, or other Internet access and communication modules, an accident, hazard, or impact detection system or interface. It will be appreciated that in other embodiments, the power controller can be connected to two or more telematics devices 444. The power controller 440 can also include a memory, a clock, and an input/output (I/O) interface (not shown).

The control system 441 can be a processor-enabled device that is configured to control the power system and/or the TCCS 451, e.g., climate controller 107 of FIG. 1, and/or the automotive system, e.g., interconnectivity between the parts, that is configured to perform the electrical isolation of the high voltage continuously producing power source using a method, such as, method 300 of FIG. 3. The control system 441 can receive a signal from an accident, hazard, impact detection system or interface 446 to detect whether a fault state or condition has occurred, e.g., CAN bus signal, that indicates a critical fault, e.g., automotive system failure, electrical system failure, or the like, accident, roll-over event, system self-detected faults that indicate a high voltage risk, physical system fault where mechanical, impact, or rapid unplanned disassembly has occurred or has been detected, a fault or risk that has been detected manually, or other detected event that requires rapid system isolation to protect against high voltage exposure. The accident, hazard, impact detection system or interface 446 can be an inclinometer, an accelerometer, a gyroscope, in which if a triggering event is detected, e.g., rapid deceleration, automotive vehicle orientation or angular velocity or rotational speed exceeds a threshold value, or the like. In an embodiment, the accident, hazard, impact detection system or interface 446 can be configured to monitor the solar panel array 431 performance, e.g., working or not, for example, by monitoring and detecting any changes in voltage, current or other fault conditions. In some embodiments, the control system 441 can detect other systems in the automotive system to determine whether or not to trigger electrical isolation of at least one of the components of the high voltage continuously producing power source, such as, the photovoltaic cells. In some embodiments, the accident, hazard, impact detection system or interface 446 can be configured to determine a fault state or condition by using the inclinometer, an accelerometer, and/or a gyroscope that is on the automotive vehicle or the power electronics powering the TRS/TRU. The control system 441 can also receive a signal for controlling the inverter channel(s) 443, e.g., frequency and V/Hz for the supply of electrical energy to the loads, e.g., the TCCS 451. In an embodiment, the DC combiner 434 can be configured to monitor the solar panel array to detect any changes in voltage, current, or other fault conditions to trigger the activation of the electrical isolation device 432-1, . . . , 432-6. The DC combiner 434 can be configured to send a signal to the power control system 441, the accident, hazard, impact detection system or interface 446, and/or directly to the electrical isolation device 432-1, . . . , 432-6.

In some embodiments, a power distribution module 460 can be electrically connected between the battery 421 and the power controller 440 via DC Bus 445 for receiving or providing electrical power. The power distribution module 460 can be configured to control the power distribution from the battery 421, e.g., to supply power to the electric machine, e.g., electric machine 212 of FIG. 2, when the automotive vehicle is an electric vehicle or another load of the automotive system, and/or send electrical power from the power controller 440 to charge the battery 421. In some embodiments, an auxiliary battery charger 465 can be provided for charging the battery 421. The auxiliary battery charger 465 can be a generator, e.g., combustion engine, for providing power for charging the battery 421 or can be a connection to the utility power network, e.g., shore power, etc. In some embodiments, the power distribution module 440 can be configured to control power distribution to other components of the automotive system or vehicle, e.g., accessories, AC units, e.g., cabin AC, or the like.

As such, the systems and methods discussed herein, have at least the following advantages:

The ability to isolate specific components of the solar panel array, e.g., solar panel photovoltaic cells or panel strings, so that the maximum voltage for series connected panel strings is below a predetermined threshold, e.g., below 60 VDC or 50 VRMS, 50 VDC, 40 VDC, etc. following a fault state or condition that needs rapid system isolation to protect against high voltage exposure.

The ability to use solar panel photovoltaic cells that each produce or generate high voltage electrical power, e.g., greater than 60 VDC, 80 VDC, 100 VDC, etc., to form a series string to provide 400-1600 VDC electrical power to the system, e.g., panel strings or sub-strings, in order to improve system efficiency and reduce the wire gauge and number of wires for connecting the solar panel array system to the system, e.g., automotive system and/or TRS/TCCS.

The ability to use small components without mechanical contactors or moving parts for the electrical isolation devices that can fit within the components of the solar panel array and be installed in a low profile configuration.

The ability to use discrete, analog, digital, and/or data signals to rapidly trigger a remote isolation of the electrical isolation device to quickly isolate and prevent or reduce the risk of high voltage exposure. The electrical isolation device can also remain isolated in cases where power is lost to the automotive system for additional high voltage exposure protection.

That is, the systems and methods disclosed herein can include an electrical isolation device that can be configured to respond to a control signal input from the automotive system or TRS control system when a fault state or condition is detected, e.g., a critical fault or system malfunction, or accident, e.g., impact or roll-over, to enable the electrical isolation device(s) to trigger to disable certain solar panel-to-solar panel connections, e.g., photovoltaic cells or panel strings. In an embodiment, the electrical isolation devices can be configured to act in a normally open response, such that when the close signal is stopped or removed, the electrical isolation devices fails open to result in the solar panel to solar panel string disconnection. As such, the systems and methods discussed herein result in a configuration in which the solar panel array, or components thereof, e.g., photovoltaic cells, is normally active at electrical power voltages greater than 60 VDC, but would be reduced to isolated segments, panel strings, or photovoltaic cells that each have a voltage of less than 60 VDC or 50 VRMS or configurable by the user when exposed to solar energy when a fault state or condition is detected.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "able to operably coupled", to each other to achieve the desired functionality.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

Aspects

Any of aspects 1-9 can be combined with any of aspects 10-15 and aspect 16. Any aspects 10-15 can be combined with aspect 16.

Aspect 1. A method for electrically isolating a high voltage continuously producing power source, the method comprising:

a high voltage power controller receiving high voltage electrical power from the high voltage continuously producing power source;

the high voltage power controller providing the high voltage electrical power to a load in a system;

the high voltage power controller detecting that a fault state of the system that is powered by at least the high voltage continuously producing power source has occurred; and electrically isolating at least one of a plurality of components of the high voltage continuously producing power source that supplies the high voltage electrical power by disconnecting the at least one of the plurality of components of the high voltage continuously producing power source that is providing the high voltage electrical power to the load of the system, when the detected fault state is detected.

Aspect 2. The method of aspect 1, wherein the high voltage continuously producing power source includes a solar panel array and the plurality of components includes solar panel photovoltaic cells of the solar panel array.

Aspect 3. The method of any one of aspects 1 or 2, wherein the electrically isolating the at least one of the plurality of components of the high voltage continuously producing power source comprises irreversibly disconnecting the at least one of the plurality of components.

Aspect 4. The method of aspect 3, wherein the irreversibly disconnecting the at least one of the plurality of components includes triggering a pyrotechnical switch to disconnect the high voltage continuously producing power source from the system.

Aspect 5. The method of aspect 4, wherein the triggering of the pyrotechnical switch includes at least one of remotely activating the pyrotechnical switch via a signal from the high voltage power controller and automatically activating the pyrotechnical switch when the fault state is detected.

Aspect 6. The method of any of aspects 1-2, wherein the electrically isolating the at least one of the plurality of components of the high voltage charge source is only manually resettable.

Aspect 7. The method of any one of aspects 1-2, wherein the disconnecting of the at least one of the plurality of components of the high voltage continuously producing power source includes opening a solid state switching device or relay to disconnect the at least one of the plurality of components of the high voltage continuously producing power source, wherein the solid state switching device or relay is only manually resettable to reconnect the at least one of the plurality of components to the automotive system.

Aspect 8. The method of any one of aspects 1-7, wherein the detected fault state comprises one or more of a critical fault, accident, or roll-over event.

Aspect 9. The method of any one of aspects 1-8, wherein the predetermined voltage threshold is below 60 VDC or 50 VRMS.

Aspect 10. A high voltage continuously producing power supplying system for supplying high voltage electrical power to an automotive system, the high voltage continuously producing power supply system comprising:

a plurality of components configured to supply the high voltage electrical power to a load in the automotive system;

a high voltage power controller configured to receive the high voltage electrical power from the plurality of components; and an electrical isolation device configured to electrically isolate at least one of the plurality of components by disconnecting the at least one of the plurality of components from the high voltage continuously producing power supplying system to prevent the at least one of the plurality of components from providing the high voltage electrical power to the load of the automotive system, wherein the high voltage power controller is configured to detect that a fault state of the automotive system has occurred and when the detected fault state is detected, the high voltage power controller is configured to trigger the electrical isolation device to disconnect the at least one of the plurality of components from the load of the automotive system.

Aspect 11. The high voltage continuously producing power supplying system of aspect 10, wherein the high voltage continuously producing power supplying system includes a solar panel array and the plurality of components includes solar panel photovoltaic cells of the solar panel array.

Aspect 12. The high voltage continuously producing power supplying system of any of aspects 10-11, wherein the electrical isolation device is a pyrotechnical switch and is configured to irreversibly disconnect the at least one of the plurality of components.

Aspect 13. The high voltage continuously producing power supplying system of aspect 12, wherein the pyrotechnical switch is configured to be triggered to irreversibly disconnect the at least one of the plurality of components by at least one of being remotely triggered and automatically triggered when the fault state is detected.

Aspect 14. The high voltage continuously producing power supplying system of any of aspects 10-11, wherein the electrical isolation device is a solid state relay that is configured to disconnect the at least one of the plurality of components, wherein the solid state relay is only manually resettable to reconnect the at least one of the plurality of components to the automotive system.

Aspect 15. The high voltage continuously producing power supplying system of any of aspects 10-14, wherein the detected fault state comprises one or more of a critical fault, accident, or roll-over event.

Aspect 16. An automotive system comprising:

a solar array that includes a plurality of solar panel photovoltaic cells for supplying high voltage electrical power to a load of the automotive system;

a high voltage power controller configured to receive the high voltage electrical power from the solar array; and an electrical isolation device configured to electrically isolate at least one of the plurality of solar panel photovoltaic cells by disconnecting the at least one of the plurality of solar panel photovoltaic cells from the load in the automotive system, wherein the high voltage power controller is configured to detect whether a fault state of the automotive system has occurred and when the detected fault state is detected, the high voltage power controller is configured to trigger the electrical isolation device to disconnect the at least one of the plurality of solar panel photovoltaic cells from the load in the automotive system.

What is claimed is:

1. A method for electrically isolating a high voltage continuously producing power source, the method comprising:

a high voltage power controller receiving high voltage electrical power from the high voltage continuously producing power source;

the high voltage power controller providing the high voltage electrical power to a load in a system;

the high voltage power controller detecting that a fault state of the system that is powered by at least the high voltage continuously producing power source has occurred;

the high voltage power controller determining whether one or more of a plurality of components of the high voltage continuously producing power source that supplies the high voltage electrical power to the load of the system is generating a voltage greater than a predetermined threshold value; and electrically isolating the one or more of the plurality of components of the high voltage continuously producing power source that is generating the voltage that is greater than the predetermined threshold value by disconnecting only a portion of the one or more of the plurality of components, when the detected fault state is detected such that the one or more of the plurality of components is continuously producing the voltage that is less than the predetermined threshold value, wherein the electrically isolating the one or more of the plurality of components of the high voltage continuously producing power source comprises irreversibly disconnecting the portion of the one or more of the plurality of components.

2. The method of claim 1, wherein the high voltage continuously producing power source includes a solar panel array and the plurality of components includes solar panel photovoltaic cells of the solar panel array.

3. The method of claim 1, wherein the irreversibly disconnecting the one or more of the plurality of components includes triggering a pyrotechnical switch to disconnect the high voltage continuously producing power source from the system.

4. The method of claim 3, wherein the triggering of the pyrotechnical switch includes at least one of remotely activating the pyrotechnical switch via a signal from the high voltage power controller and automatically activating the pyrotechnical switch when the fault state is detected.

5. The method of claim 1, wherein the detected fault state comprises one or more of a critical fault, accident, or roll-over event.

6. The method of claim 1, wherein the predetermined voltage threshold is below 60 VDC or 50 VRMS.

7. The method of claim 1, wherein the high voltage electrical power prior to electrical isolation is between 400 and 1600 VDC.

8. The method of claim 1, wherein each of the one or more of the plurality of components of the high voltage continuously producing power source, after electrically isolating the one or more of the plurality of components, is generating the voltage between 12 VDC and 60 VDC.

9. A high voltage continuously producing power supplying system for supplying high voltage electrical power to an automotive system, the high voltage continuously producing power supply system comprising:

a plurality of components configured to supply the high voltage electrical power to a load in the automotive system;

a high voltage power controller configured to receive the high voltage electrical power from the plurality of components, wherein the high voltage power controller is configured to detect that a fault state of the automotive system has occurred and whether one or more of the plurality of components is generating a voltage greater than a predetermined threshold value, and when the detected fault state is detected, the high voltage power controller is configured to trigger an electrical isolation device to disconnect only a portion of the one or more of the plurality of components that is generating the voltage greater than the predetermined threshold value from the load of the automotive system such that the one or more of the plurality of components is continuously producing the voltage that is less than the predetermined threshold value; and the electrical isolation device configured to electrically isolate the one or more of the plurality of components that is generating the voltage greater than the predetermined threshold value by disconnecting only the portion of the one or more of the plurality of components to prevent the one or more of the plurality of components from providing the high voltage electrical power, wherein the electrical isolation device is configured to irreversibly disconnect the portion of the one or more of the plurality of components.

10. The high voltage continuously producing power supplying system of claim 9, wherein the high voltage continuously producing power supplying system includes a solar panel array and the plurality of components includes solar panel photovoltaic cells of the solar panel array.

11. The high voltage continuously producing power supplying system of claim 9, wherein the electrical isolation device is a pyrotechnical switch.

12. The high voltage continuously producing power supplying system of claim 11, wherein the pyrotechnical switch is configured to be triggered to irreversibly disconnect the one or more of the plurality of components by at least one of being remotely triggered and automatically triggered when the fault state is detected.

13. The high voltage continuously producing power supplying system of claim 9, wherein the detected fault state comprises one or more of a critical fault, accident, or roll-over event.

14. An automotive system comprising:

a solar array that includes a plurality of solar panel photovoltaic cells for supplying high voltage electrical power to a load of the automotive system;

a high voltage power controller configured to receive the high voltage electrical power from the solar array, wherein the high voltage power controller is configured to detect whether a fault state of the automotive system has occurred and whether one or more of the plurality of solar panel photovoltaic cells is generating a voltage greater than a predetermined threshold value, and when the detected fault state is detected, the high voltage power controller is configured to trigger an electrical isolation device to disconnect only a portion of the one or more of the plurality of solar panel photovoltaic cells that is generating the voltage greater than the predetermined threshold value from the load in the automotive system such that the one or more of the plurality of solar panel photovoltaic cells is continuously producing the voltage that is less than the predetermined threshold value; and the electrical isolation device configured to electrically isolate the one or more of the plurality of solar panel photovoltaic cells that is generating the voltage greater than the predetermined threshold value by disconnecting only the portion of the one or more of the plurality of solar panel photovoltaic cells to prevent the one or more of the plurality of solar panel photovoltaic cells from providing the high voltage electrical power, wherein the electrical isolation device is configured to irreversibly disconnect the portion of the one or more of the plurality of solar panel photovoltaic cells.

* * * * *